No. 611,061. Patented Sept. 20, 1898.
J. E. DANN.
HEAT RETAINING STARCH COOKER.
(Application filed Feb. 5, 1898.)
(No Model.)

Witnesses.
Alfred Atkinson.
R. W. Pittman.

Inventor:
J. E. Dann.
By his Attorney
F. N. Richards.

THE NORRIS PETERS CO., PHOTO-LITHO., WASHINGTON, D. C.

UNITED STATES PATENT OFFICE.

JAMES EDWIN DANN, OF NEW YORK, N. Y.

HEAT-RETAINING STARCH-COOKER.

SPECIFICATION forming part of Letters Patent No. 611,061, dated September 20, 1898.

Application filed February 5, 1898. Serial No. 669,201. (No model.)

*To all whom it may concern:*

Be it known that I, JAMES EDWIN DANN, a citizen of the United States, residing at New York, borough of Brooklyn, in the county of Kings and State of New York, have invented certain new and useful Improvements in Heat-Retaining Starch-Cookers, of which the following is a specification.

This invention relates to a heat-retaining starch-cooker.

One object of the invention is to provide an improved starch cooker or receptacle of this character with a suitable intermediate compartment supplied with heat-retaining material, such as shear-flocks, whereby the temperature of the starch within the receptacle is not materially affected by the outside temperature.

Another object of this invention is to provide a starch-can of this character with a cover so constructed and constituted that when in position it forms, with the body of said can, a receptacle having an unbroken continuous compartment entirely surrounded by composite heat-retaining walls.

Figure 1:
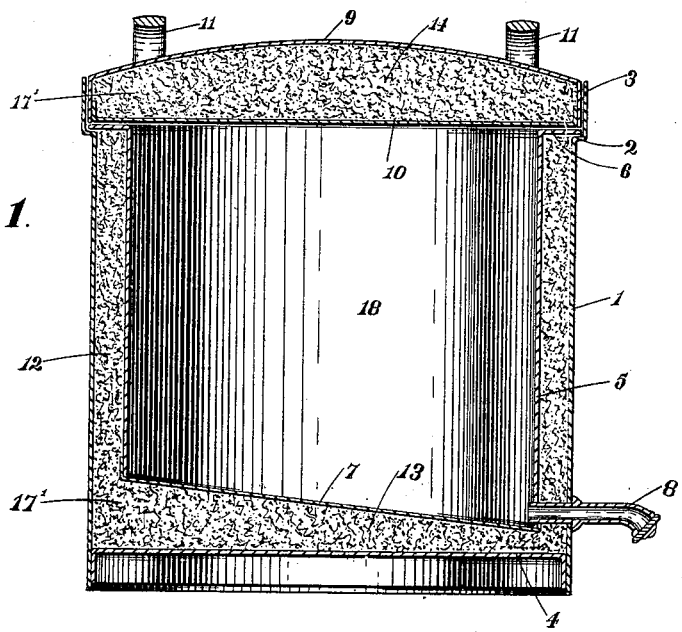
Figure 2:
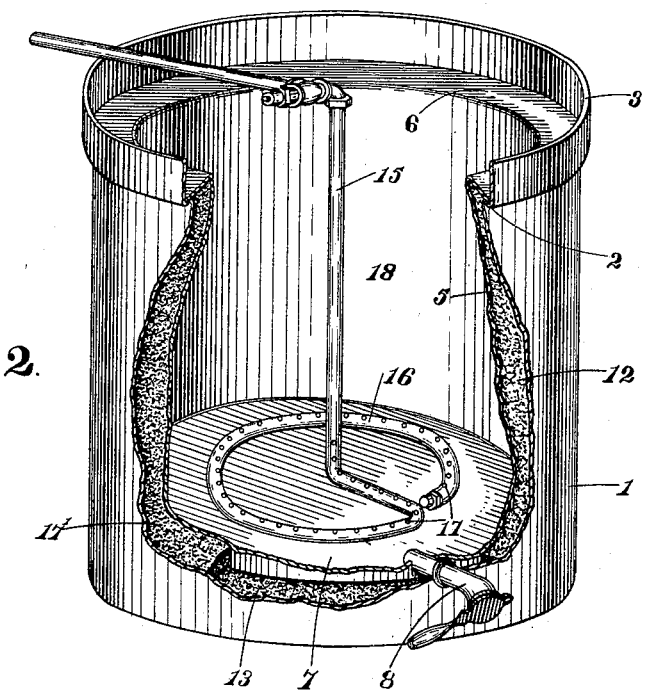

In the drawings accompanying and forming part of this invention, Figure 1 is a vertical sectional elevation of this improved starch-receptacle, and Fig. 2 is a perspective view of the same with the cover removed and a portion of the wall broken away.

Similar characters of reference designate corresponding parts in both figures of the drawings.

It is a well-known fact that starch when cooking, and particularly afterward when prepared and ready for use, should be always kept at a uniform temperature. If there is any radical lowering of the temperature of the starch after being prepared—as, for instance, through standing over night or a certain length of time—a skin is formed upon the surface, and before further use this skin must be removed and thrown away, thus occasioning a comparatively large loss of starch each time such lowering of temperature occurs.

The main object of this invention is to produce a heat-retaining starch-receptacle by furnishing the receptacle or can with double inclosing walls whereby an intermediate compartment is formed, entirely surrounding the inner wall thereof, and to provide a suitable inexpensive and readily-obtainable material to fill such compartment, preferably of fibrous nature and having great heat-retaining properties.

In one form of this improved starch cooker or receptacle, and which may be its preferred form, if desired, it comprises an inner and an outer receptacle, respectively designated, in a general way, by 1 and 5, said outer receptacle preferably comprising a cylindrical wall having one, as the upper, part thereof of larger diameter than the major part thereof, whereby a shoulder 2 and an annular rim 3 are formed. The bottom 4 of this outer receptacle is shown as a disk, which may be rigid with said receptacle; but as shown herein it is flanged and fitted into the lower end thereof. The inner receptacle 5 is shown having its body portion also preferably comprising a cylindrical wall and is of somewhat smaller diameter than the outer receptacle, whereby an annular chamber 12 is formed intermediate said outer and inner walls. The inner wall is provided with an outwardly-extending annular flange 6, which is adapted to rest upon the shoulder 2 of the outer wall, it being preferably soldered or otherwise secured thereto, and which flange forms the top wall of said intermediate chamber 12. The bottom 7 of this inner receptacle is shown as a disk, which may be rigid with or, as shown herein, flanged and fitted into the lower end of the receptacle-wall. In the present instance this bottom 7 is shown inclined toward the spout 8, whereby it is adapted to facilitate the discharge of the contents from the receptacle or to drain the interior thereof. The bottom 7 of the inner receptacle 5 is so disposed relatively to the bottom 4 of the outer receptacle as to form an intermediate chamber 13, shown herein in communication with the annular chamber 12, said chambers 12 and 13 in the present instance forming one continuous compartment intermediate said receptacles.

It will be understood that other shapes of cans or receptacles provided with the chambers above set forth may be used and that such receptacles may be also constructed in any desired and suitable manner without departing from the general scope of this invention.

This improved receptacle is provided with a cover, which is shown herein having a closed chamber 14. This cover in the present instance is formed of two flanged disks or heads 9 and 10, the upper disk being preferably of concavo-convex shape and provided with suitable handles 11 for removing the cover. A suitable source of heat-supply is in communication with the interior 18 of the inner receptacle 5 by means of a removable pipe 15, the lower end of this pipe being shown bent into a coil 16 and provided with suitable holes or apertures 17, whereby steam or heat may be admitted to the interior of the can. The intermediate chambers 12 and 13, which are preferably but not necessarily in connection, and also the chamber 14 are filled with a suitable heat-retaining substance 17'. This material, which preferably consists of shear-flocks comprising the shearings from wool-felts, has marked heat-retaining qualities. As the material is of a woolly nature and has comparatively short individual fibers, it can be very closely packed in the chambers of the receptacle, and, furthermore, while the mass of this substance will be more or less of a cellular nature and permeated with air-spaces, yet, owing to its fluffy character, free circulation of the air will be prevented, whereby the highest quality of heat-retaining substance is obtained, so that the temperature of the interior 18 of the receptacle is not materially affected by the outside temperature. Moreover, in addition to these qualities, which make the material especially adapted for use in this improved can, its cheapness and ease of handling has made the can a marked commercial success. It will be observed that when the cover is in position the interior 18 of the receptacle is entirely surrounded by a continuous compartment comprising the three chambers 12, 13, and 14, having therein heat-retaining material of a certain thickness. By making the diameter of the cover-chamber 14 substantially equal to that part of the outer receptacle 1 having the smallest diameter the side walls of said cover will be in alinement with and form a continuation of the side walls of the major portion of the receptacle, so that the heat-retaining chamber 14 of said cover has a diameter approximately equal to the outer diameter of the annular chamber 12, thereby to permit the same thickness of material to be disposed and a continuous intermediate compartment obtained around the entire interior 18 of the receptacle. This is accomplished by forming the shoulder 2 and making the rim 3 of slightly-greater diameter than the diameter of the major part of the receptacle, whereby the outer diameter of the cover may be made approximately equal to that of the major part of the receptacle, so that this shoulder has two functions—a support for the inner flange 6, and thereby the inner receptacle, and to form with the rim 3 an enlarged area, thereby to receive a cover of the diameter of the major part of the receptacle.

In the use of this improved receptacle, the cover having been removed and the pipe 15 inserted, as shown in Fig. 2, steam is admitted to the interior 18 until the starch is thoroughly cooked. The pipe is then removed and the cover replaced and the receptacle allowed to stand with its contents ready for use, whereby, owing to this improved construction of the can, the starch is maintained for a comparatively long time at a relatively even temperature.

These cans are designed to be of a sufficient capacity to hold a number of gallons, and owing to their construction the contents thereof will retain heat with comparatively little diminution a long time, so that the starch when cooked may be allowed to stand for a night or a number of hours with a decrease in temperature of but a few degrees.

Having thus described my invention, I claim—

A receptacle having a body comprising an outer receptacle provided with a laterally-extending annular flange portion and an annular rim of larger diameter than the major portion of said receptacle, and an inner receptacle disposed within said outer receptacle and forming therewith an intermediate compartment, said inner receptacle also having a laterally-extending annular flange forming the top of said intermediate compartment and which rests on the annular flange of said outer receptacle, whereby said inner receptacle is supported by the flange of said outer receptacle; a cover having a chamber adapted to fit in said outer receptacle and rest on the laterally-extending flange of said inner receptacle, the diameter of said cover-chamber being equal to the diameter of the major portion of said outer receptacle, whereby the outer side walls of said cover-chamber are in alinement with the side walls of the major part of said outer receptacle, and heat-retaining material disposed in said compartment and chamber, whereby when said cover is in position the inner receptacle is entirely surrounded by said heat-retaining material and a continuous compartment formed around the same.

JAMES EDWIN DANN.

Witnesses:
BYRON S. FERGUSON,
MILLARD P. BURLINGAME.